United States Patent [19]
Meyer, Jr.

[11] Patent Number: 5,469,062
[45] Date of Patent: Nov. 21, 1995

[54] MULTIPLE DEPTHS AND FREQUENCIES FOR SIMULTANEOUS INVERSION OF ELECTROMAGNETIC BOREHOLE MEASUREMENTS

[75] Inventor: Wallace H. Meyer, Jr., Spring, Tex.

[73] Assignee: Baker Hughes, Inc., Houston, Tex.

[21] Appl. No.: 212,194

[22] Filed: Mar. 11, 1994

[51] Int. Cl.[6] .................. G01V 3/28; G01V 3/30; G01V 3/38
[52] U.S. Cl. .............. 324/338; 324/339; 324/341; 364/422
[58] Field of Search .............. 324/323, 338–343; 364/422

[56] References Cited

U.S. PATENT DOCUMENTS

| | | | |
|---|---|---|---|
| 4,314,338 | 2/1982 | Suau et al. | 364/422 |
| 4,609,873 | 9/1986 | Cox et al. | 324/338 |
| 4,980,643 | 12/1990 | Gianzero et al. | 324/339 |
| 5,144,245 | 9/1992 | Wisler | 324/338 |
| 5,210,691 | 5/1993 | Freedman et al. | 324/339 X |
| 5,230,386 | 7/1993 | Wu et al. | 175/45 |
| 5,329,235 | 7/1994 | Zhou et al. | 324/338 |

OTHER PUBLICATIONS

"2MHz Propagation Resistivity Modeling in Thin Beds", W. Hal Meyer, The Log Analyst, Jul.–Aug. 1993, p. 33.
"Inversion of 2 MHz Propagation Resistivity Logs" W. H. Meyer, Society of Professional Well Log Analysts, 33rd Annual Logging Symposium, Jun. 14–17,. 1992.

Primary Examiner—Gerard R. Strecker
Attorney, Agent, or Firm—Gunn & Associates

[57] ABSTRACT

A wave propagation measurement-while-drilling system is used to determine selected formation and borehole properties. One or more transmitter-receiver pairs are utilized with the transmitter components operating at one or more frequencies to provide a measured data set. A model relating the borehole instrument response to a wide range of formation and borehole conditions is also utilized. Inversion techniques are employed to determine selected formation and borehole parameters of interest and to simultaneously correct the selected formation parametric measurements for the adverse effects of the borehole and formation bed boundaries thereby avoiding serial type corrections which can yield erroneous results in certain frequency ranges.

33 Claims, 5 Drawing Sheets

MULTIPLE DEPTHS AND FREQUENCIES FOR SIMULTANEOUS INVERSION OF ELECTROMAGNETIC BOREHOLE MEASUREMENTS

BACKGROUND OF THE INVENTION

This invention is directed toward the measure of geophysical parameters of earth formations penetrated by a borehole. The invention employs propagation resistivity techniques utilizing a downhole instrument comprising multiple, longitudinally spaced transmitters operating at different frequencies with a plurality of longitudinally spaced receiver pairs. An electromagnetic wave is propagated from the transmitting antenna coil into the formation in the vicinity of the borehole and detected as it passes the receiving antenna of the receiver pair. The basic parameters measured at the receivers are the amplitude and phase shift of the sensed electromagnetic wave. The downhole instrument is conveyed along the borehole by a drill string or other means thereby making the basic measurements as a function of position or depth of the downhole instrument within the borehole. A plurality of parameters of interest can be determined by combining the basic measurements. Such parameters include the resistivity, dielectric constant and porosity of the formation as well as the degree to which the fluid within the borehole migrates into or "invades" the virgin formation. Numerous factors affect the accuracy and precision of the desired parametric measurements. These include, but are not limited to, the radial position of the measuring device within the well bore, the shape or eccentricity of the borehole, the type of borehole fluid and the electrical and mechanical characteristics of the transmitters and receivers. In addition the amplitude and phase measurements made at different transmitter-receiver spacings or at different transmitter frequencies exhibit different responses to vertical changes in the formation as the instrument is conveyed along the borehole. The invention is further directed toward the combination of multiple electromagnetic propagation measurements to obtain more accurate and precise measurements of formation resistivity, dielectric constant, porosity and borehole fluid invasion profile when the perturbing effects of the borehole environs and vertical resolution properties of the transmitter receiver combinations have been minimized. The invention is still further directed toward the measure of the properties of the well bore itself which may be used to evaluate mechanical properties of the rock and the effectiveness of the drilling program.

Induction techniques have been used for a number of years to determine the resistivity of earth formations penetrated by a borehole. Historically, formation resistivity has been used to delineate hydrocarbons from saline formation waters. Resistivity cannot, however, be used to delineate hydrocarbon from relatively fresh formation waters since both fluids exhibit very high resistivity. The resistivity contrast between the resistivity of hydrocarbon and fresh water is less than the precision of borehole resistivity measurement systems. Hydrocarbons and waters, both saline and fresh, do exhibit measurable contrast in dielectric constant. Dielectric constant can therefore be used to delineate hydrocarbons from fresh waters or waters of unknown salinity as well as will be discussed later. Using induction techniques to measure formation parameters, an alternating current is applied to one or more transmitters of the borehole instrument thereby generating an electromagnetic field in the vicinity of the transmitter. The primary field interacts with the earth formation thereby setting up secondary fields with the amplitude and the phase of the secondary fields being related to electromagnetic properties of the formation. Amplitude and phase are the primary or "raw" parameters measured by the receivers. These raw measurements are combined to obtain the parameters of interest and to eliminate unwanted noise as will be detailed in this disclosure.

As mentioned previously amplitude and phase measurements made at different transmitter receiver spacings and at different frequencies exhibit different vertical resolutions. Prior art has matched the vertical resolutions using various convolution and deconvolution techniques prior to combining multiple measurements. This is referred in the art as "serial" data processing. U.S. Pat. No. 4,609,873 to Percy T. Cox, et al teaches the use of a wireline logging system comprising at least three transmitter coils and at least two receiver coils to determine resistivity and dielectric constant of a subsurface formation adjacent to a drilling fluid invaded zone. The transmitters are operated at a single frequency of 30 MHz. Amplitude and phase measurements are made and serial processing of the data is employed. At relatively low transmitter frequencies, serial processing introduces only negligible errors. At higher transmitter frequencies in the 2 MHz range or higher, vertical resolution is affected not only by the physical arrangement of the transmitter receiver combinations, but also significantly by the electromagnetic properties of the borehole environments and the formation. The functional dependence of vertical resolution and transmitter frequency is addressed in the publication "2-MHz Propagation Resistivity Modeling in Invaded Thin Beds", W. Hal Meyer, *The Log Analyst,* July-August 1993, p. 33 and "Inversion of 2 MHz Propagation Resistivity Logs", W. H. Meyer, *SPWLA 33rd Annual Logging Symposium,* Paper H, Jun. 14–17, 1992. Stated another way, serial processing of data can introduce significant error at transmitter frequencies in the range of 2 MHz and higher. In order to obtain accurate and precise parametric determinations at these frequencies, it is necessary to compute the parameters of interest and to make the required corrections, including corrections for the effects of differing vertical resolutions, simultaneously. Methods for accomplishing this goal will be detailed in this disclosure.

SUMMARY OF THE INVENTION

The present invention is directed toward the accurate measure of the resistivity and other geophysical parameters of earth formations penetrated by a borehole. The invention is further directed toward the processing of eight independent measurements related to formation properties and borehole environment properties thereby obtaining the desired geophysical parameters of interest simultaneously with any required corrections. This invention is still further directed to obtaining measurements of borehole and near borehole parameters which have not been available in the prior art and which yield valuable information concerning mechanical properties of the rock formation and perhaps information concerning the effectiveness of the drilling program. The borehole device comprises an elongated mandrel and further comprises an array of two receivers and two pairs of symmetrically spaced transmitters. All transmitters and receivers are positioned longitudinally along the mandrel portion of the downhole instrument. Each transmitter pair is located symmetrically on each side of a point midway between the receiver pair. The preferred embodiment is directed toward, although not limited to, measurement while drilling (MWD) applications. In the MWD embodiment, the mandrel comprises a drill collar which is conveyed along the borehole by the drill string. The transmitters and receivers comprise coils of one or more turns wrapped around the outside of the drill collar, with the axis of the transmitter and receiver coil being coincident with axis of the drill collar. All coils are electrically insulated from the metallic drill collar. Power sources and control circuitry for the transmitters and receivers are located within the drill collar It is common in the art to utilize pairs of transmitters and receivers to minimize or "compensate" for gross effects of the borehole and to compensate for certain electromechanical properties of the borehole instrument. This subject is addressed in details in a U.S. application Ser. No. 08/188,064, filed Jan. 26, 1994, U.S. Pat. No. 5,438,267, which is assigned to the current assignee and is hereby entered in this disclosure by reference.

In the preferred embodiment both amplitude and phase measurements are made at two frequencies of 400 KHz and 2 MHz and at two effective transmitter-receiver spacings. This yields a total of eight independent measurements per depth interval as the borehole device is conveyed along the borehole. In principle the set of eight equations can be solved for eight "unknowns". The unknowns include the geophysical formation properties of resistivity, dielectric constant and porosity, and additional parameters quantifying invasion and borehole properties such as rugosity and ellipticity. The latter borehole parameters have been considered as sources of "noise" in prior art resistivity measurements When quantified, however, such borehole characteristics provide useful information concerning rock properties and the effectiveness of the drilling program. Finally, resolution matching of measurements of different vertical resolutions is accomplished simultaneously in the solution of the set of eight equations. In the preferred embodiment, the eight independent parameters are: $R_{p,n,1}$, $R_{a,n,1}$, $R_{a,f,1}$, $R_{a,f,1}$, $R_{p,n,2}$, $R_{a,n,2}$, $R_{p,f,2}$, and $R_{a,f,2}$, where the subscript p and a denote phase difference and amplitude ratio measurements calculated using the two receivers, respectively, n and f denote near and far spacing between the transmitter receiver pairs, respectively, and 1 and 2 denote transmitter frequency $\omega_1$ and $\omega_2$, respectively. It is noted that these eight "measured" signals receive some preprocessing and are not directly measured "raw" amplitude and phase signals from each of the sixteen possible symmetrical transmitter-receiver combinations. Measurements from symmetrical transmitter-receiver pairs are combined using techniques known in the art to eliminate error such as that induced by rapidly varying borehole conditions prior to processing using the methods of this invention. Combination of signals from symmetric transmitter-receiver pairs to minimize adverse environmental and system effects are disclosed in detail in the previously cited U.S. patent application Ser. No. 08/188,064. The combination of the above eight measurements to obtain parameters of interest will be detailed in the following discussions.

It should be understood that the invention is not bound or limited to the transmitter-receiver spacings and operating frequency combinations described above. Any combinations which respond differently to vertical and radial changes in the borehole environs are suitable embodiments of the invention. As an example, amplitude and phase measurements made at a single effective transmitter-receiver spacing and at four frequencies will yield eight independent measurements per depth interval. As a second example, amplitude and phase measurements made at four effective transmitter-receiver spacings and at a single operating frequency will likewise yield eight independent measurements per depth interval. Transmitter-receiver spacing and operating frequency combinations can be varied even further to yield a set of independent measurements which is greater or less than eight. It should be understood, however, that the number of unknown parameters that can be uniquely determined increases or decreases as the number of independent measurements increases or decreases.

BRIEF DESCRIPTION OF THE DRAWINGS

So that the manner in which the above recited features, advantages and objects of the present invention are obtained and can be understood in detail, more particular description of the invention, briefly summarized above, may be had by reference to the embodiments thereof which are illustrated in the appended drawings. It is to be noted, however, that the appended drawings illustrate only typical embodiments of the invention and are therefore not to be considered limiting of its scope for the invention may admit to other equally effective embodiments.

DETAILED DESCRIPTION OF THE PREFERRED EMBODIMENT

Figures 1, 2:
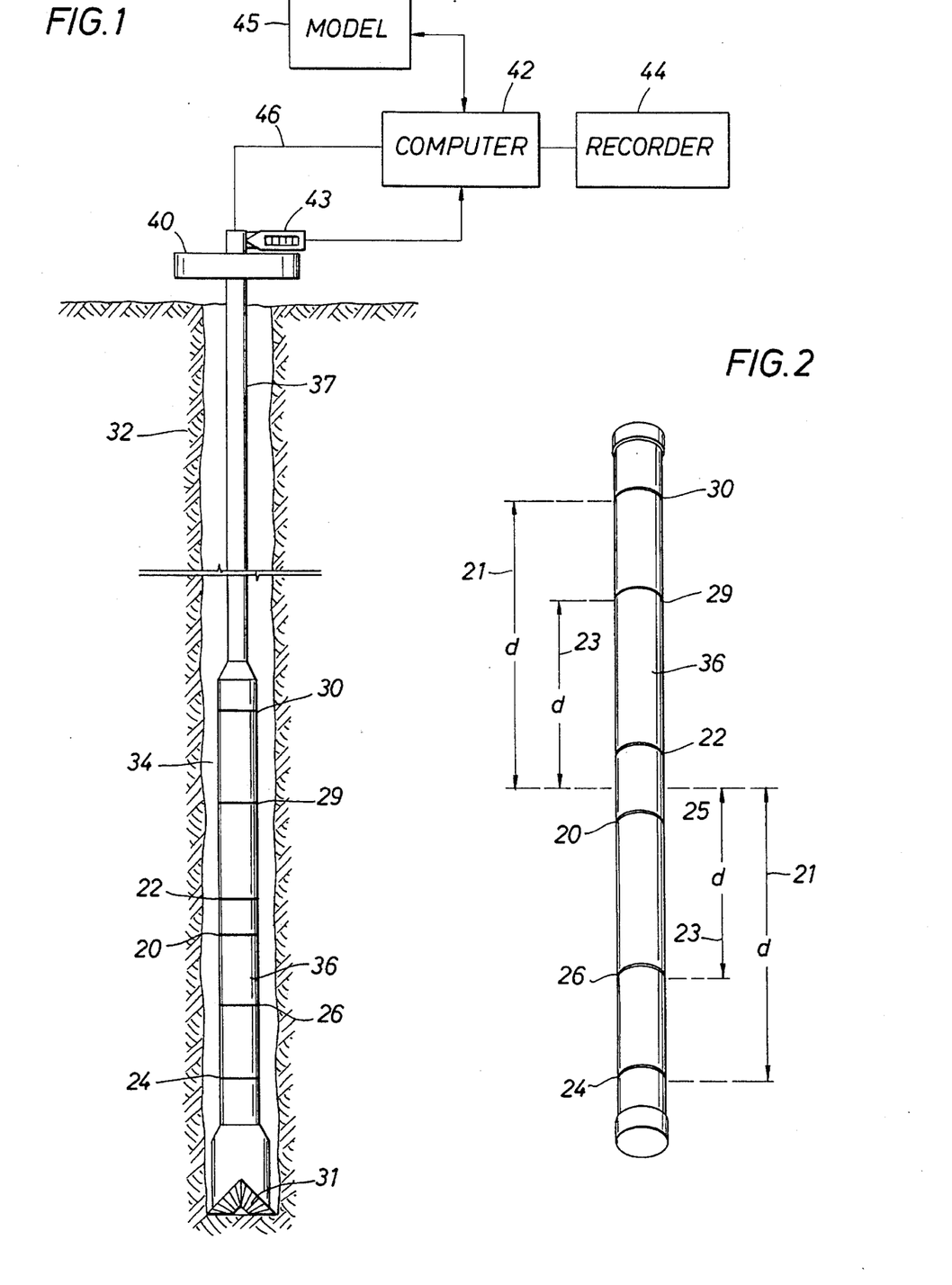
FIG. 1 illustrates the invention in a measurement-while-drilling (MWD) embodiment.
FIG. 2 shows a more detailed view of the transmitter and receiver arrays mounted on a drill collar.

The invention employed in a MWD environment is illustrated in a very general manner in FIG. 1. The drill bit 31 is attached to the metallic drill collar 36 which in turn is mounted on a wellbore drill string 37. This assembly is shown suspended in a well bore 34 which penetrates the earth formation 32. A means of rotating the drill string 37 is identified by the numeral 40. Four transmitter coils of one or more turns are identified by the numeral 26, 24, 29 and 30. The axes of these coils are coincident with the axis of the drill collar 36. The coils are electrically insulated from and slightly recessed within the outer diameter of the drill collar thereby comprising integral elements of the collar assembly. Two receiver coils are identified by the numerals 20 and 22. Geometries of these coils are quite similar to the geometries of the transmitter coils and again comprise integral elements of the collar assembly 36. Power sources and control circuitry (not shown) for the transmitter and receivers are contained within the drill collar assembly 36. Data recorded by the receivers can either be transmitted in real time to the surface using drill fluid pulsing means (not shown) or stored in downhole memory 14 and subsequently retrieved at the surface. For a real-time data transmission embodiment, signals from the receiver are transmitted to the surface by a path means generically denoted by the numeral 46, transferred to a CPU 42 for processing using a borehole instrument response model 45 and correlation with depths from a drill collar depth indicator 43, and output to recorder 44 which displays the computed parameters of interest as a function of depth at which the input measurements were made.

An alternate embodiment comprises a processor unit 16 contained within the drill collar 36 in which the borehole instrument response model 45 is stored and with which measured data are processed downhole rather than at the surface of the earth. Memory capacity of most MWD borehole instruments is limited. In order to most effectively utilize downhole memory, it is often more efficient to process measured data downhole and store the results rather than store the more voluminous measured data.

Details of the drill collar 36 containing the transmitter and the receiver arrays are shown in FIG. 2. The near spacing $d_n$ between transmitter and receiver is denoted by the numeral 23 and the far spacing $d_f$ is denoted by the numeral 21. Both the near spacing distances 23 and far spacing distances 21 are measured with respect to the midpoint 25 between the receivers 20 and 22. Point 25 is commonly referred to as the "measure point" of the borehole instrument. For transmitter frequency $\omega 1$ the phases of the signal detected at receivers 20 and 22 resulting from the sequential transmission from transmitters 26 and 29 are combined algebraically to obtain $R_{p,n,1}$. More specifically, transmitter 26 is activated and "raw" phase shifts of the transmitted signal are measured at both receiver 20 and 22. The difference of these two phase shift measurements is computed yielding a first relative phase shift between receivers 20 and 22. Transmitter 29 is activated and raw phase shifts are again measured at both receivers 22 and 20, and a second relative phase shift is computed from the difference of these two raw phase shift measurements. The first and second relative phase shift measurements are then averaged yielding an average relative phase shift for the effective transmitter-receiver pair spacing 23 from which the apparent resistivity $R_{p,n,1}$ is computed. The amplitudes of these received signals are simultaneously measured and combined yielding $R_{a,n,1}$. More specifically, transmitter 26 is activated and "raw" amplitude attenuations of the transmitted signal are measured at both receiver 20 and 22. The ratio of these two amplitude attenuation measurements is computed yielding a first relative amplitude attenuation between receivers 20 and 22. Transmitter 29 is activated and raw amplitude attenuations are again measured at both receivers 22 and 20, and a second relative amplitude attenuation is computed from the ratio of these two raw amplitude attenuation measurements. The first and second relative amplitude attenuation measurements are then averaged yielding an average relative amplitude attenuation for the effective transmitter-receiver pair spacing 23 from which the apparent resistivity $R_{a,n,1}$ is computed. Again for a transmitter frequency $\omega_1$, the phase of the signals received at receivers 20 and 22 resulting from the sequential transmission from transmitters 24 and 30 are likewise combined algebraically to obtain $R_{p,f,1}$. The amplitudes of these signals are likewise simultaneously measured and combined yielding $R_{a,f,1}$. The above sequence is repeated with a second transmitter frequency $\omega_2$ yielding $R_{p,n,2}$, $R_{a,n,2}$, $R_{p,f,2}$ and $R_{a,f,2}$. The end result is eight apparent resistivity measurements comprising a total of thirty-two amplitude and phase shift measured at two transmitter-receiver spacings and at two transmitter frequencies.

Figure 3:
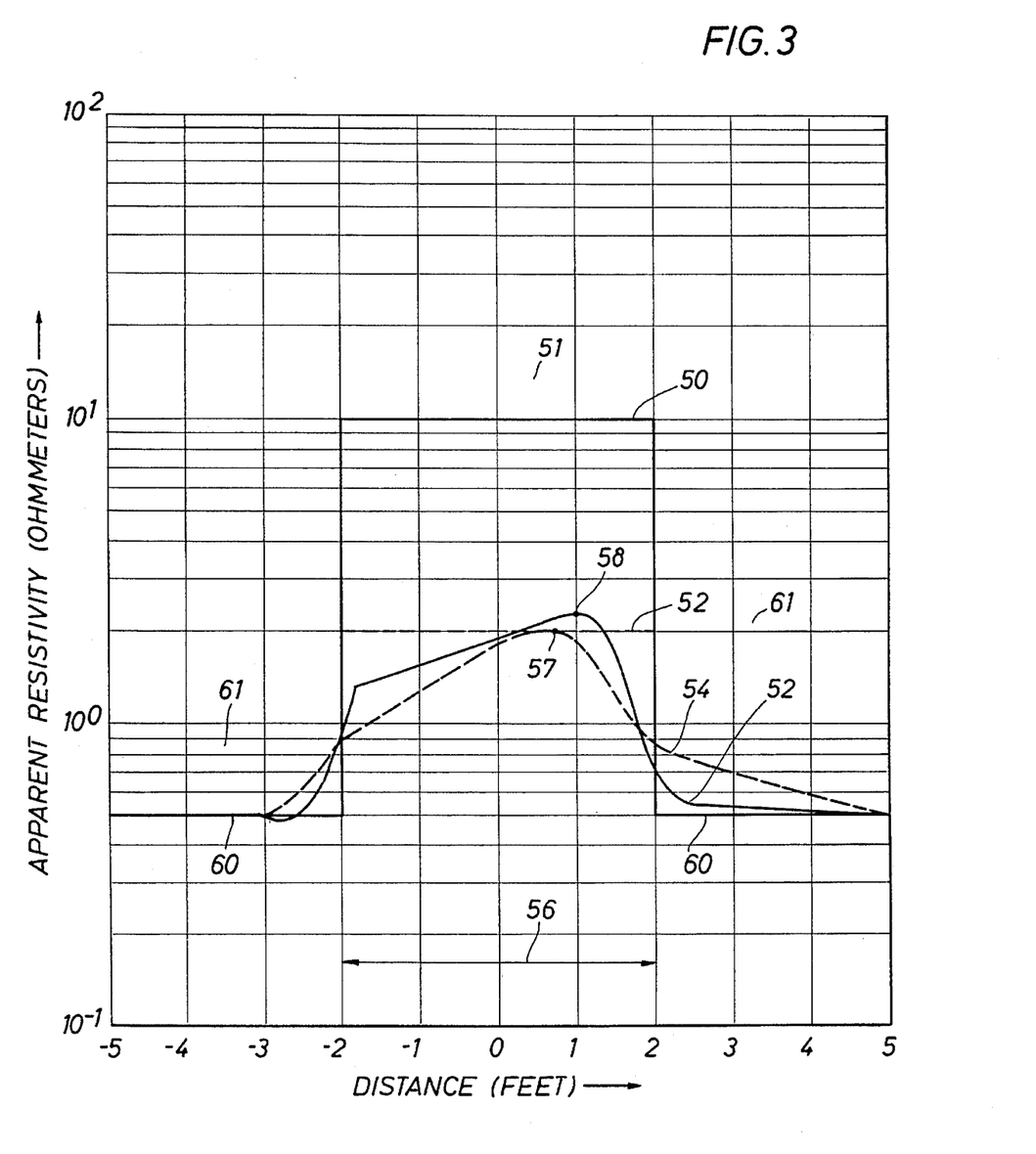
FIG. 3 illustrates measured amplitude and phase resistivities across a relatively thin formation bounded by formations of essentially infinite vertical extent.
Figure 4:
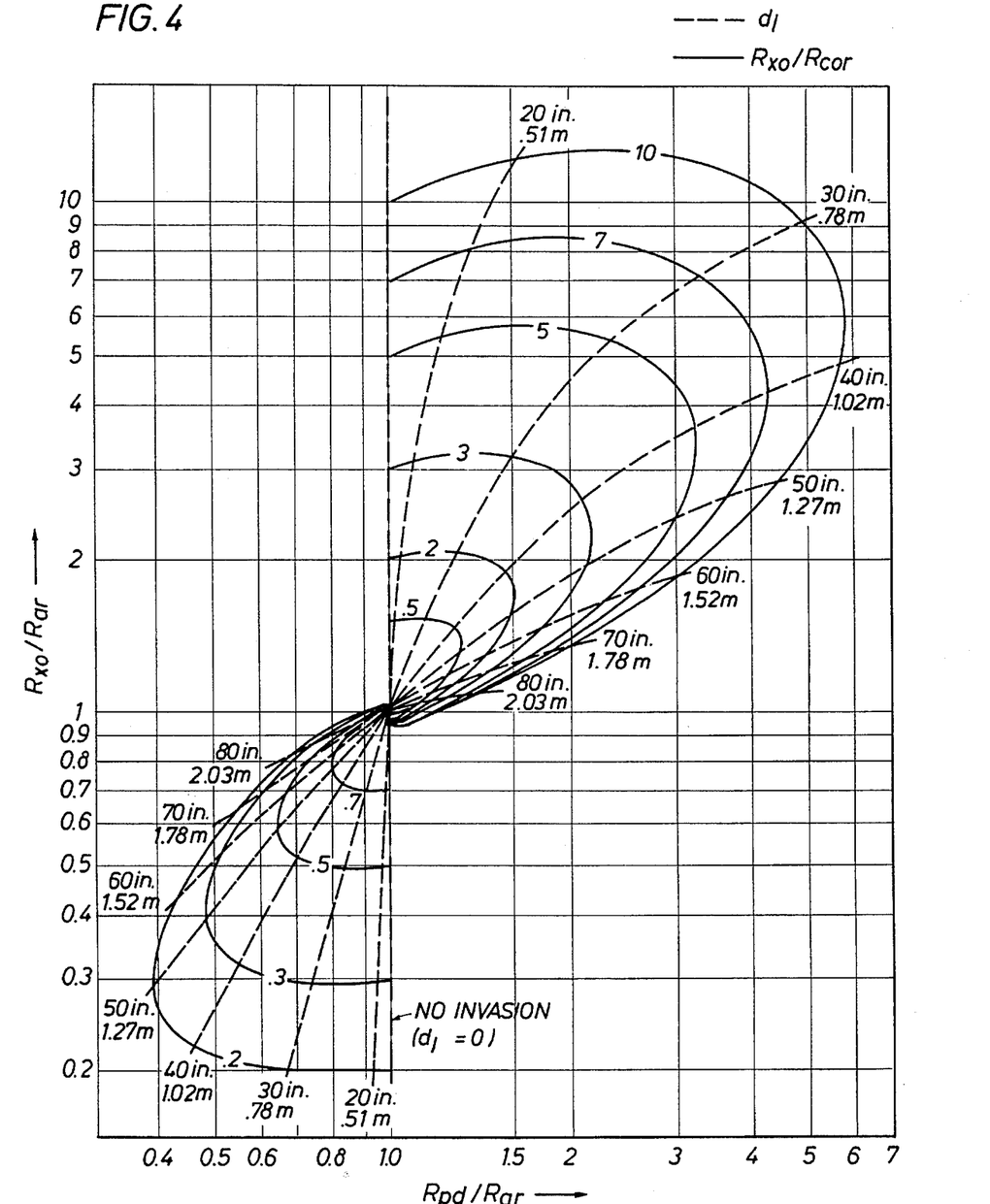
FIG. 4 is a graphical depiction of an algorithm for serially correcting apparent resistivity for the effects of invasion of the drilling fluid.
Figure 5:
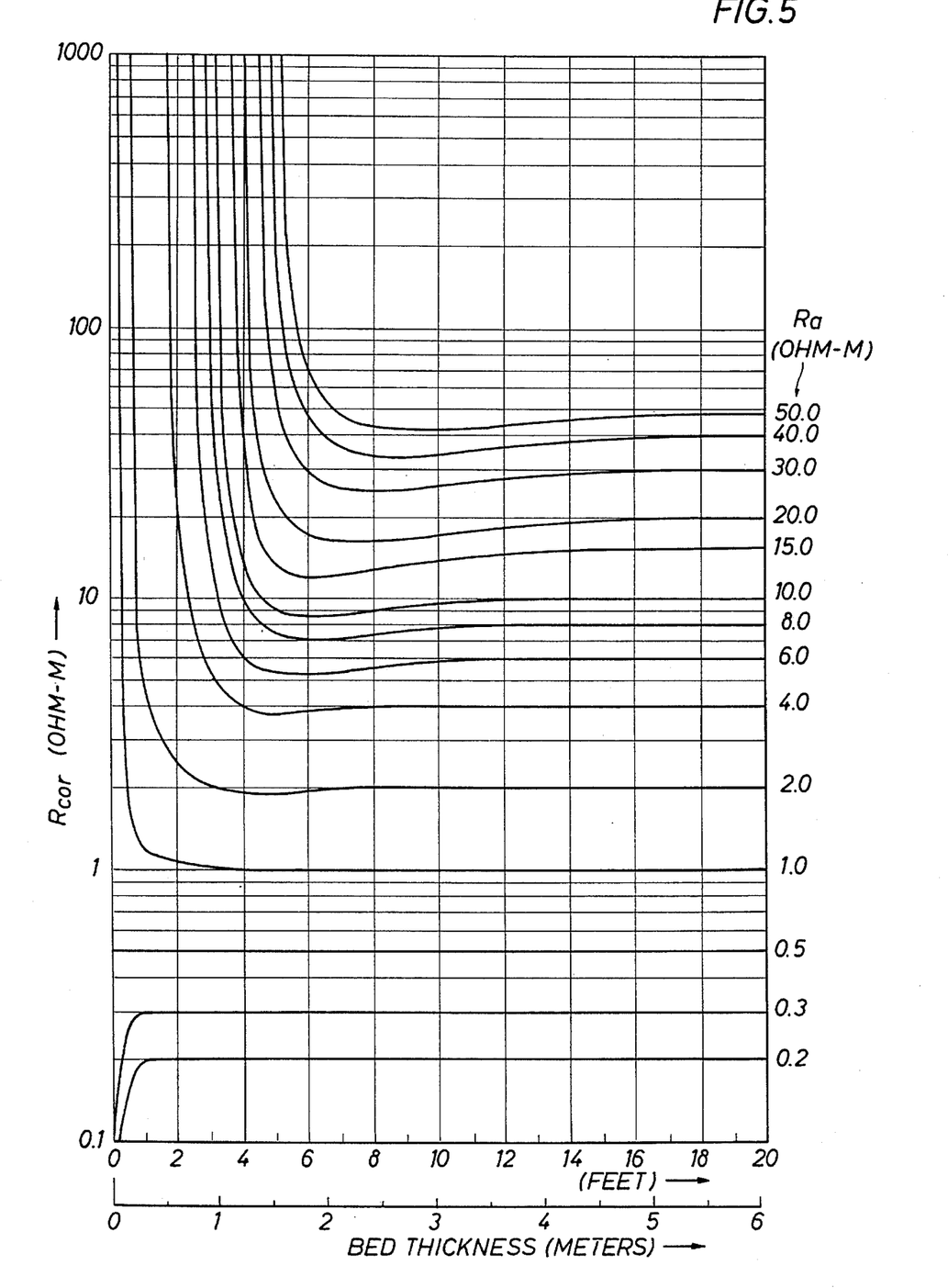
FIG. 5 is a graphical depiction of an algorithm for serially correcting phase resistivity measurement for the effects of finite bed thickness.
Figure 6:
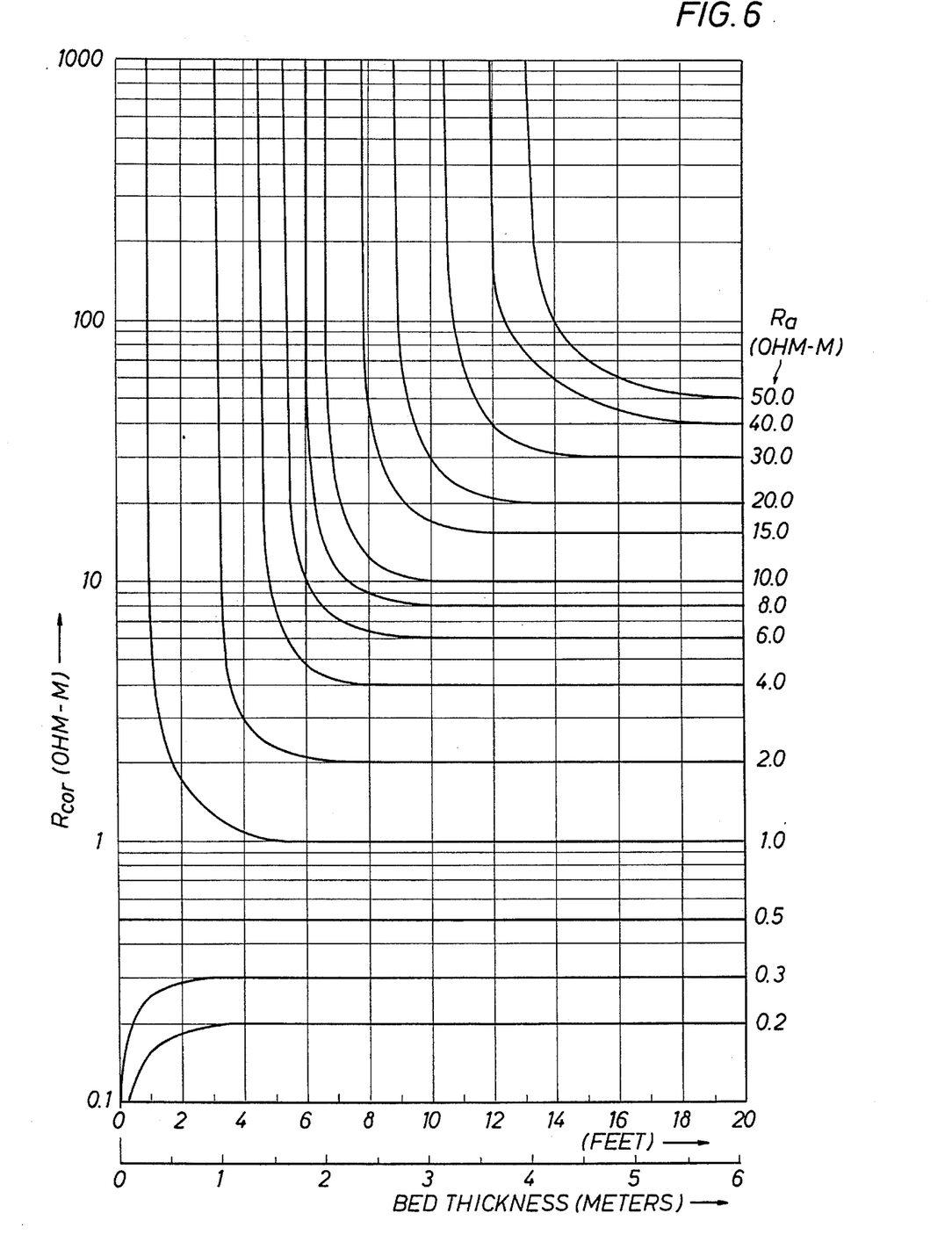
FIG. 6 is a graphical depiction of an algorithm for serially correcting amplitude resistivity measurement for the effects of finite bed thickness.

FIG. 3 illustrates hypothetical measurements of resistivity across a thin formation bed denoted by the numeral 51. This bed of vertical extent 56 is bounded on either side by formation of essentially infinite vertical extent identified by the numeral 61. In the example, the vertical extent 56 of bed 51 is 4.0 feet. The true resistivity of the bed is 10 ohm meters as illustrated by curve 50 and the bed is invaded to a depth of $d_i$=60 inches, with the resistivity of the invaded zone $R_{xo}$=2.0 ohm meters as illustrated by curve 53. The resistivity of the surrounding or shoulder formation, $R_{SHOULDER}$=0.5 ohm meters, is illustrated by curve 60. The shoulder formations are not invaded by the drilling fluids. Curves 52 and 54 illustrate the apparent phase and amplitude resistivities measured across the bed boundaries at a transmitter frequency of $\omega_1$=2 MHz. Using previously defined nomenclature, curve 52 is computed from $R_{p,f,1}$ and curve 54 is calculated from $R_{a,f,1}$. Note that similar curves are generated at a second frequency $\omega_2$ but are not shown. It can be seen that the maximum or peak values of curves 52 and 54 within zone 51, denoted by the numerals 58 and 57, respectively, are 2.23 and 2.07 ohm meters, respectively. Both apparent resistivity measurements diverge greatly from the actual or true resistivity of $R_t$=10 ohm meters. FIG. 4 is a graphical representation of an algorithm for correcting apparent resistivity measurements made at a frequency of 2 MHz for the effects of invasion in formations of infinite vertical extent. This correction algorithm was calculated using radially cylindrical electromagnetic models well known in the art. Using values for $d_i$=60 inches, $R_{xo}$=2.0 ohm meters and the maximum phase and amplitude values of 2.23 and 2.07 ohm meters, respectively, the resulting "corrected" value for true resistivity, $R_{cor}$=2.09 ohm meters, still exhibiting significant divergence from the actual bed resistivity value of 10.0 ohm meters. Bed boundary corrections are applied to the maximum phase and amplitude resistivity measurements 58 and 57 using correction algorithm depicted graphically in FIGS. 5 and 6, respectively, using a bed thickness of 4.0 feet. The algorithms as graphically represented were calculated using layered electromagnetic models well known in the art. $R_a$ denotes apparent resistivity measurement in using the charts. These corrected values are then serially corrected for invasion, again using the synthetic data depicted graphically in FIG. 3. After applying both bed boundary corrections and invasion corrections serially, the resulting "corrected" value for true resistivity is $R_{cor}$=5.2 ohm meters which still exhibits significant deviation from the true resistivity value of 10.0 ohm meters. It is apparent that serial corrections for the hypothetical example at a frequency of 2 MHz is totally inadequate. Similarly, the same sequence of corrections using corresponding amplitude and phase resistivities made at $\omega_2$=400 MHz is also totally inadequate. Serial corrections for additional parameters such as borehole diameters, resistivity of the drilling fluid, dielectric effects and formation anisotropy also yield inadequate corrections at either transmitter frequency for true resistivity.

The current invention utilizes the eight previously defined measurements of apparent resistivity along with the comprehensive model of the response of the borehole instrument in a variety of formation and borehole conditions to simultaneously determine formation and borehole parameters of interest. The process is generally defined by the matrix equation:

$$[R]=[T]\times[X] \tag{1}$$

where [R] is a 1×8 matrix representing eight measures of apparent resistivity at multiple frequencies and transmitter spacings as defined previously, and [X] is a 1×8 matrix representing 8 parameters of interest to be determined. For the example being considered, $R_t$, $R_{xo}$, $R_{SHOULDER}$, $d_i$ and the thickness of the zone 56 are included as elements of the matrix [X]. [T] is an 8×8 transform matrix or "borehole instrument response model" based upon the comprehensive model of the borehole instrument response in a variety of borehole and formation conditions. The model is obtained from mathematical calculations of the responses of the borehole instrument in a variety of formation and borehole conditions, or from measured responses of the borehole instrument in a variety of known formation and borehole calibration facilities, or from both. As an example, [T] comprises the response functions for the borehole instrument across bed boundaries, the responses characteristics as a function of invasion, and response functions for all other borehole and formation parameters discussed previously in this disclosure. The values of the elements of [T] will depend upon resistivity and will, therefore, depend upon the matrices [X] and [R]. As a result of this functional dependence, equation (1) is not a simple linear matrix equation. U.S. Pat. No. 5,144,245 to M. M. Wisler, assigned to the assignee of this disclosure, describes such a model and is hereby entered by reference. A non-linear regression scheme is used to invert the equation (1) yielding $$[X]=[T']\times[R]. \qquad (2)$$

where [T'] is the inversion of the matrix [T]. The example in FIG. 3 is simplified even further to specifically illustrate the solution of equation (2). For simplicity, the reciprocal of resistivity, conductivity, is used in the solution. Because the tool response model is not fully parameterized due to the simplicity of the example, the effect of the background resistivity is subtracted so that only invaded zone parameters are analyzed. As an example, (2 mhos/meters (mhos/m), the reciprocal of 0.5 ohm/meters, is subtracted from the measured conductivities leaving negative conductivity values. The measured phase resistivity transforms to $-1.552$ mhos/m $R_1$) and the amplitude ratio resistivity transforms to $-1.517$ mhos/m ($R_2$). The effect of formation conductivity on measured phase conductivity and amplitude ratio conductivity is 0.623798 ($T_{21}$) and 0.48305 ($T_{11}$), respectively. The effect of the bed thickness on the measured phase conductivity and the amplitude ratio conductivity is $-0.403595$ ($T_{22}$) and $-0.391326$ ($T_{12}$) respectively. Standard methods are then used to solve the matrix [T] and compute [T'] with array parameters of $T'_{11}$, $T'_{12}$, $T'_{21}$ and $T'_{22}$ of $-8.2116$, $7.96155$, $-12.6912$ and $9.82767$, respectively. The product $[T']\times[R]$ then yields the matrix [X] with elements $X_1$ and $X_2 = 0.1$ mhos/m and 4.0 feet, respectively. Inverting the conductivity reading yields the solutions of 10 ohm/meter and 4.0 feet for $R_t$ and the thickness of the bed of vertical extent 56. This simplified example is a linear solution, while solutions involving fully parameterized model matrices require non-linear regression schemes. Solving equation for [X], which includes $R_t$ as an element, a corrected value of $R_t=10$ ohm meters is obtained for the hypothetical example shown in FIG. 3. More specifically for this example, the matrix elements $R_{11}$, $R_{21}$, and $R_{31}$ represent the measured quantities $R_{p,f,1}$, $R_{a,f,1}$ and $R_{p,f,2}$, respectively, $R_t$, $R_{xo}$ and $d_i$ represent the parameters of interest or "answers", respectively, and [T'] is a 3×3 matrix whose elements represent the relationships between the measured quantities and the parameters of interest. The fact that sets for two transmitter frequencies are used in the present invention contributes to the convergence of the measured and true formation resistivities when compared to the previous computations using only measurements at 2 MHz. Equally important in the conversion is that the current invention employs simultaneous inversion of the measurements at multiple frequencies and multiple spacings. The errors introduced at higher frequencies resulting from serial processing are thus avoided.

The above description may make other alternative embodiments of the invention apparent to those skilled in the art. It is therefore the aim of the appended claims to cover all such changes and modifications as fall within the true spirit and scope of the invention.

What is claimed is:

1. A wave propagation method for measuring electromagnetic properties of earth formation penetrated by a borehole and simultaneously correcting said measurements for the adverse effects of drilling fluid invasion and bed boundary conditions, comprising:

(a) providing a borehole instrument comprising at least two transmitter-receiver pairs;

(b) operating each said transmitter at a first operating frequency and at a second operating frequency thereby inducing electromagnetic radiation within the borehole and formation environs at each operating frequency;

(c) measuring the amplitude and phase of electromagnetic radiation detected by the receiver component of each said transmitter-receiver pair and computing values of apparent resistivity, at each said operating frequency, from the ratios of said amplitude measurements from each receiver pair, and from the differences of said phase measurements from each said receiver pair;

(d) providing a model of the response of said borehole instrument which relates said apparent resistivity measurements to a plurality of formation and borehole parameters representative of the environs in which said borehole instrument is expected to operate, and wherein said model is obtained from apparent resistivity determinations made with said borehole instrument operating in environs of known formation and borehole parameters;

(e) selecting, from said plurality of formation and borehole parameters, parameters of interest to be determined;

(f) mathematically combining said apparent resistivity measurements with said instrument response model to compute said parameters of interest and simultaneously correct said parameters of interest for the adverse effects of formation bed boundary and borehole perturbation effects; and (g) repeating (b) through (f) as said borehole instrument is conveyed along the borehole.

2. The method of claim 1 where said first operating frequency falls within the range of 500 KHz to 12 MHz and said second operating frequency falls within the range of 100 KHz to 6 MHz.

3. The method of claim 2 wherein the depth of said borehole instrument in the borehole is tracked.

4. The method of claim 3 wherein said parameters of interest are recorded as a function of depth within the borehole at which they were determined.

5. The method of claim 4 wherein said borehole instrument is conveyed along the borehole with a drill string.

6. The method of claim 4 wherein the borehole instrument is conveyed along the borehole with a wireline.

7. A wave propagation apparatus for measuring electromagnetic properties of earth formation penetrated by a borehole and simultaneously correcting said measurements for the adverse effects of drilling fluid invasion and bed boundary conditions, comprising:

(a) a borehole instrument comprising at least two transmitter-receiver pairs with the transmitter components of said transmitter-receiver pairs operating at at least two frequencies thereby inducing a response within the receiver components of said transmitter-receiver pairs;

(b) a borehole instrument response model which relates said responses of said receiver components of said transmitter-receiver pairs to a plurality of formation and borehole parameters representative of the environs in which said borehole instrument is expected to operate, and wherein said model is obtained from determinations of the responses of said receiver components of said transmitter-receiver pairs in environs in which formation and borehole parameters are known;

(c) power and control circuits for said transmitter-receiver pairs;

(d) a conveyance apparatus for conveying said borehole instrument along the borehole;

(e) a CPU for mathematically processing by combining said responses by said receiver components of said transmitter-receiver pairs with said borehole instrument response model stored in said CPU thereby obtaining processed data, said processed data comprising parameters of interest selected from said plurality of formation and borehole parameters;

(f) a data transfer system for transferring said receiver responses to said CPU;

(g) a depth indicator for tracking the depth of said borehole instrument along said borehole; and (h) a recorder for recording said processed data as a function of depth along said borehole at which data used to generate said processed data is measured.

8. The apparatus of claim 7 where said conveyance apparatus comprises a wireline.

9. The apparatus of claim 7 where said conveyance apparatus comprises a drill string.

10. The apparatus of claim 9 wherein said means for transferring said responses by said receivers to said data processing means comprises a mud pulse system with said data processing means being located at the surface of the earth.

11. The apparatus of claim 9 wherein said data transfer system for transferring said response by said receivers to said CPU comprises a downhole memory for recording and storing said data in the borehole instrument and one or more electrical conductors for subsequently transferring said data from said downhole memory to said CPU when said borehole instrument is retrieved at the surface of the earth.

12. The apparatus of claim 8 wherein said data transfer system for transferring said response by said receivers to said CPU comprises one or more electrical conductors contained within said wireline.

13. A wave propagation method for measuring electromagnetic properties of earth formation penetrated by a borehole and simultaneously correcting said measurements for drilling fluid invasion and bed boundary conditions, comprising:

(a) providing a borehole instrument comprising four transmitter-receiver pairs;

(b) operating each said transmitter at a first operating frequency and a second operating frequency thereby inducing electromagnetic radiation within the formation and borehole environs;

(c) measuring the amplitude and phase of electromagnetic radiation detected by the receiver component of each said transmitter-receiver pair and computing values of intermediate resistivity, at each said operating frequency, from the ratios of said amplitude measurements from each receiver pair, and from the differences of said phase measurements from each said receiver pair thereby obtaining a total of sixteen said intermediate resistivity measurements;

(d) combining said intermediate resistivity measurements from transmitter-receiver pairs of equal longitudinal spacing thereby obtaining eight measures of apparent resistivity in which the adverse effects of rapidly changing borehole conditions and variations in the circuitry of said borehole instrument are minimized;

(e) providing a model of the response of said borehole instrument which relates said eight measures of apparent resistivity to a plurality of formation and borehole parameters representative of the environs in which said borehole instrument is expected to operate, and wherein said model is obtained from determinations of said eight measures of apparent resistivity in environs in which formation and borehole parameters are known;

(f) selecting, from said plurality of formation and borehole parameters, parameters of interest which are to be determined;

(g) computing said parameters of interest and simultaneously correcting said parameters of interest by mathematically combining said eight measures of apparent resistivity with said instrument response model;

(h) tracking the depth of said borehole instrument along the borehole;

(i) recording said parameters of interest as a function of depth within the borehole at which they were determined;

(j) conveying said borehole instrument along the borehole by means of a drill string; and (k) repeating (b) through (i) as said borehole instrument is conveyed along the borehole.

14. The method of claim 13 wherein said four transmitter-receiver pairs are comprised of four transmitters and two receivers.

15. The method of claim 14 wherein said combination of said eight apparent resistivity values and said borehole instrument response model comprises the steps of:

(a) formulating said eight values of apparent resistivity in the form of a 8×1 apparent resistivity matrix;

(b) formulating said borehole instrument model in the form of an 8×8 model matrix;

(c) formulating an 8×1 parameter matrix which contains the parameters of interest;

(d) equating the product of said model matrix and said parameter matrix to said apparent resistivity matrix thereby forming a first matrix equation;

(e) employing a non-linear regression scheme to invert said first matrix equation to form a second matrix equation which equates said parameter matrix to the product of said apparent resistivity matrix and the transform of said model matrix; and (f) solving said second matrix equation to obtain said parameter matrix wherein said parameters of interest are represented by the elements of said parameter matrix.

16. The method of claim 15 wherein said first operating frequency falls within the range of 500 KHz to 12 MHz and said second operating frequency falls within the range of 100 KHz to 6 MHz.

17. The method of claim 16 wherein said parameters of interest comprise formation resistivity and formation dielectric constant.

18. A wave propagation apparatus for measuring electromagnetic properties of earth formation penetrated by a borehole and simultaneously correcting said measurements for drilling fluid invasion and bed boundary effects, comprising:

(a) an elongated borehole instrument comprising two receivers and four transmitters;

(b) means for operating said transmitters at a first operating frequency and a second operating frequency thereby producing responses of said receivers to electromagnetic radiation produced by the operation of said transmitters;

(c) power and control circuits for said transmitters and said receivers contained within the borehole instrument;

(d) a model of the response of said borehole instrument which relates the responses of said receivers to electromagnetic radiation, resulting from said transmitter operations, to a plurality of formation and borehole parameters representative of the environs in which said borehole instrument is expected to operate, and wherein said model is obtained from determinations of the responses of said receivers with said transmitters operating in environs in which formation and borehole parameters are known;

(e) a CPU for mathematically processing responses of said receivers with said borehole instrument response model thereby obtaining processed data, said processed data comprising parameters of interest selected from said plurality of formation and borehole parameters;

(f) a data transfer system for transmitting said responses of said receivers to said CPU;

(g) a conveyance apparatus for conveying said borehole instrument within the borehole;

(h) a depth indicator for tracking the depth of said borehole instrument within the borehole; and (i) a recorder for recording said responses of said receivers and said processed data as a function of said depth.

19. The apparatus of claim 18 wherein said conveyance apparatus for conveying said borehole instrument along the borehole is a wireline.

20. The apparatus of claim 18 wherein said conveyance apparatus for conveying said borehole instrument along the borehole is a drill string.

21. The apparatus of claim 20 wherein said elongated borehole instrument further comprises:

(a) a drill collar;

(b) a first receiver and a second receiver, each receiver comprising coils of one or more turns wrapped around the outer diameter of said drill collar and electrically insulated from said drill collar and positioned longitudinally along the axis of said drill collar with the axes of said coils and the axis of said drill collar being coincident; and (c) four transmitters comprising coils of one or more turns, said coil turns being wrapped around the outside diameter of said drill collar and electrically insulated from said drill collar and arranged in longitudinally spaced pairs with each pair being symmetrically spaced on either side of a point midway between the positions of said first and said second receivers.

22. The apparatus of claim 21 wherein said first operating frequency falls within the range of 500 KHz to 12 MHz and said second operating frequency falls within the range of 100 KHz to 6 MHz.

23. The apparatus of claim 22 wherein said data transmission means comprises a drilling fluid pulsing system.

24. The apparatus of claim 22 wherein said data transfer system comprises a memory, contained within said drill collar, with which said measured data are recorded and stored for subsequent retrieval and processing by said CPU when said drill collar is returned to the surface of the earth.

25. A wave propagation method for measuring electromagnetic properties of earth formation penetrated by a borehole and simultaneously correcting said measurements for the adverse effects of drilling fluid invasion and bed boundary conditions, comprising:

(a) providing a borehole instrument comprising one or more transmitter-receiver pairs;

(b) operating each said transmitter at one or more operating frequencies thereby inducing electromagnetic radiation within the borehole and formation environs at each operating frequency;

(c) measuring the amplitude and phase of electromagnetic radiation detected by the receiver component of each said transmitter-receiver pair and at each said operating frequency thereby obtaining a set of data parameters;

(d) providing a model of the response of said borehole instrument which relates mathematically said data parameters to a plurality of formation and borehole parameters representative of the borehole and formation environs in which said borehole instrument is expected to operate, and wherein said model is obtained from determinations of said data parameters in environs in which formation and borehole parameters are known;

(e) selecting, from said plurality of formation and borehole parameters, parameters of interest to be determined;

(f) combining mathematically said set of data parameters with said instrument response model to compute said parameters of interest and simultaneously to correct said parameters of interest for the adverse effects of formation bed boundary and borehole perturbation effects; and (g) repeating (b) through (g) as said borehole instrument is conveyed along the borehole.

26. The method of claim 25 where said first operating frequency falls within the range of 500 KHz to 12 MHz and said second operating frequency falls within the range of 100 KHz to 6 MHz.

27. The method of claim 26 wherein the depth of said borehole instrument in the borehole is tracked.

28. The method of claim 27 wherein said parameters of interest are recorded as a function of depth within the borehole at which they were determined.

29. The method of claim 28 wherein said borehole instrument is conveyed along the borehole with a drill string.

30. A wave propagation apparatus for measuring electromagnetic properties of earth formation penetrated by a borehole and simultaneously correcting said measurements for the adverse effects of drilling fluid invasion and bed boundary conditions, comprising:

(a) a borehole instrument comprising one or more transmitter-receiver pairs with the transmitter components of said transmitter-receiver pairs operating at at least one frequency;

(b) power and control circuits for said transmitters and receivers contained within said borehole instrument;

(c) a conveyance apparatus for conveying said borehole instrument along the borehole;

(d) a model of the response of said borehole instrument which relates the responses of the receiver components of said transmitter-receiver pairs to electromagnetic radiation produced by the operation of said transmitter components in a plurality of formation and borehole conditions representative of the environs in which said borehole instrument is expected to operate, and wherein said model is obtained from determinations of the responses of said receiver components of said transmitter-receiver pairs in environs in which formation and borehole parameters are known;

(e) a downhole processor contained within said borehole instrument for mathematically processing the responses of the receiver components of said transmitter-receiver pairs with said borehole instrument response model thereby obtaining processed data, said processed data comprising parameters of interest selected from said plurality of formation and borehole parameters;

(f) a depth indicator for tracking the depth of said borehole instrument along said borehole;

(g) a data transfer system for transferring said processed data or said responses of said receivers or both to the surface of the earth; and (h) a recorder for recording said processed data as a function of depth along said borehole at which said responses of said receivers used to generate said processed data are measured.

31. The apparatus of claim 30 where said conveyance apparatus for conveying said borehole instrument is a drill string.

32. The apparatus of claim 31 wherein said conveyance apparatus for transferring said measured data or said processed data or both to the surface of the earth comprises a drilling fluid pulsing system.

33. The apparatus of claim 31 wherein said data transfer system for transferring said measured data or said processed data or both to the surface of the earth comprises downhole memory recording and memory means contained within said borehole instrument with which said measured data or processed data or both are stored for subsequent retrieval when said borehole instrument is returned to the surface of the earth.

* * * * *